United States Patent Office 2,860,987
Patented Nov. 18, 1958

2,860,987

PROCESS FOR PRECIPITATING TANNINS AND PROTEINACEOUS MATERIALS FROM LIQUID MEDIA

Jesse Werner, Holliswood, N. Y., assignor to General Aniline & Film Corporation, New York, N. Y., a corporation of Delaware No Drawing. Application October 31, 1957
Serial No. 693,530

6 Claims. (Cl. 99—48)

The present invention relates to an improved method for removing tannins and/or protein-tannin complexes from liquid media containing the same.

The substantial removal or elimination of tannins and/or protein-tannin complexes from liquid mediums containing the same is highly desirable in order to effect improvement in taste, clarity, purity, stability and the like. In the food, beverage and drug industries, it is necessary to remove natural tannin substances such as tannic acids and tannins, and protein-tannin complexes. For instance, in the preparation of beer from extracts of barley and hops, wine from pressed grapes, brandy, whiskey, fruit juices, tea or coffee, sugar cane extracts, etc. it is necessary to remove tannins or tannic acid.

As the art is now practiced, tannins are precipitated from various liquid mediums containing the same by the addition of various coagulating and precipitating agents, such as for example, ferric hydroxide, lead acetate, gelatin, caffeine, casein, skimmed milk, activated charcoal and the like.

In a majority of cases, while employing such coagulating and precipitating agents, the residue of the precipitant or of the tannin or tannic acid remains in the solution either from the necessity of using an excess of the precipitant or coagulant, from metathesis incidental to precipitation, or from incomplete precipitation. The residue thus remaining is undesirable and even injurious, thus rendering these methods of precipitation unsuitable for many purposes.

I have discovered that natural tannin substances, i. e. tannic acid and tannins and/or protein-tannin complexes, are substantially and in a majority of cases quantitatively precipitated from liquid media, especially aqueous and alcoholic solutions containing them, by the addition of a coagulating or precipitating amount of a polyacrylamide having the following general formula:

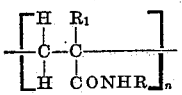

wherein R represents either hydrogen, methyl or ethyl group, $R_1$ represents either hydrogen or methyl and $n$ represents the extent of polymerization as indicated by the molecular weight which may range from 100,000 to 2,500,000. Polymers having a molecular weight range of 500,000 to 700,000 with an average of 600,000, are preferred since they are commercially available.

The polyacrylamides characterized by the foregoing general formula include polyacrylamide per se, polymethacrylamide, poly-N-alkylacrylamides, including copolymers of acrylamide with methacrylamide and N-alkylacrylamides. The range or proportion of monomers utilized in preparing the copolymers is immaterial, since a copolymer containing as little as 5–10% of acrylamide and the balance of either methacrylamide or an alkyl or an N-alkylacrylamide will possess sufficient water, alcohol and alcohol-water solubility to effect either precipitation or coagulation of natural tannins and/or protein-tannin complexes, provided however, that the molecular weight be within the aforesaid range.

As illustrative examples of poly-N-alkylacrylamides, the following are the only ones I have found to possess solubility in water, alcohol and aqueous alcohol solutions:

Poly-N-methylacrylamide
Poly-N-ethylacrylamide

The acrylamide polymers and copolymers utilized in accordance with the present invention are usually prepared by irradiation in ethanol with ultraviolet light. By this procedure it is well known to the art (United States Patent 2,533,166), that polymers and copolymers are obtained which are soluble not only in water but alcohol and alcohol-water solutions. The polymethacrylamide may be readily obtained by polymerizing the monomer by heating with peroxide catalyst in the presence of ultraviolet light (United States Patent 2,486,191). The polymerization and copolymerization is generally effected either in water solution or from methanol solution to yield water soluble polymers and copolymers.

Natural tannin substances such as tannic acids and tannins are readily precipitated from alcohol, alcohol-water and aqueous solutions containing them by the addition of a precipitating amount of any one of the polyacrylamides and copolymers thereof. For practical purposes, I have found that not only are the tannins and tannic acid substantially and completely precipitated, but the polyacrylamide whether in the form of a polymer or copolymer is likewise substantially and completely precipitated when added in the ratio of 2 to 2.5 times the weight of the natural tannin substances present in said solutions. Thus, the stoichiometric relation of the polyacrylamide (either polymer or copolymer) to tannic acid or tannin in the precipitate remains constant regardless of the presence of an excess of either the tannin substance or the precipitant in the combination. The precipitation of tannic acid from aqueous alcohol or water-alcohol solutions containing them by the use of the polyacrylamides was found to be substantially quantitative, i. e. 99 to 100%. After the precipitation of the natural tannin substances the precipitate can be removed from the liquid medium by centrifuging, filtering, settling or decanting to yield a clear solution. In the case where clarification of the solution is not necessary and it is merely desired to remove the natural tannin substances, the precipitate can be allowed to remain in the fluid mixture.

The precipitation or coagulation of protein-tannin complexes from various liquid mediums after the addition of polyacrylamide (either polymer or copolymers), can be very readily determined by simple spot experiments. Each liquid medium may require an amount of polyacrylamide which may be more or less than another liquid medium. In other words, the finding of exact amounts will have to be determined by using minimum and maximum amounts of polyacrylamide for each fluid whereby the exact amount will be indicated in the particular operation.

The polyacrylamides utilized in accordance with the present invention are advantageous in the removal of tannin substances and protein-tannin complexes from beer, wine, coffee, tea, fruit juices, vinegar, etc. to improve their quality especially at low temperatures, and above all the removal of undesirable tastes. They are employed to advantage in clarifying various industrial solutions and in the preparation of pharmaceutical extracts from materials containing tannins, tannic acid and protein-tannin complexes.

The following examples, which are merely illustrative, will show how the process of the present invention may be practiced.

Example I

A 10% aqueous solution of polyacrylamide having an average molecular weight of 600,000 was prepared by using distilled water. A 1.0% solution of tannic acid in distilled water was prepared. 10 cc. of the above polyacrylamide solution was added to 100 cc. of the above tannic acid solution, with the formation of a heavy white precipitate. After stirring for a few minutes, a 10 cc. aliquot was removed and centrifuged for 20 minutes. The clear supernatent liquid was decanted.

It is known that polyvinylpyrrolidone can be coagulated in aqueous solution by means of tannic acid. Thus, according to Schildknecht "Vinyl and Related Polymers" (1952), page 676, polyvinylpyrrolidone is precipitated by tannic acid upon addition of 0.1 ml. of 5% aqueous tannic acid to 1 ml. of 10% aqueous solution of polyvinylpyrrolidone in order to determine whether the tannic acid was completely removed from solution by the polyacrylamide. To 5 cc. of the above clear supernatent liquid were added several cc. of a 5% aqueous solution of polyvinylpyrrolidone having a K value of 30. No precipitate formed. This clearly indicates that the tannic acid was completely removed from solution by the polyacrylamide.

The above procedure was repeated with whiskey and beer with the same good results.

Example II

To 100 cc. of bourbon (unchilled Schenley, Ancient Age) is added 2 cc. of polyacrylamide solution (5% in distilled water). The polyacrylamide has an average molecular weight of 600,000. No change is observed initially. However, upon standing overnight, a substantial white curdy precipitate settled out leaving a clear supernatant liquid, lighter in color than a blank sample.

Example III 2 cc. of a 5% aqueous acrylamide solution of Example II was added with stirring to 100 cc. of commercial untreated beer. Upon standing at room temperature for 2 days a sizeable white precipitate was obtained which left a clear supernatant liquid after filtration.

Example IV

To 100 cc. of freshly squeezed grape juice was added, with stirring, 2 cc. of a 5% aqueous polymethacrylamide (molecular weight of 500,000) solution. No change was noticed immediately. However, upon standing for 5 days, a small white precipitate settled out. This precipitate was filtered off, leaving a clear supernatant liquid.

Example V

To 100 cc. of a commercially available port wine having an alcohol content of 20% there were added with stirring 2 cc. of 5% aqueous poly-N-methylacrylamide (molecular weight of 450,000) solution. No change was noticed immediately. However, upon standing for 7 days a small white precipitate settled out. This precipitate was filtered off leaving a clear supernatant liquid.

Example VI

To 50 ml. of freshly filtered beer, which had not been enzyme treated and which had not been pasteurized, contained in a 4 oz. glass vial, there was added 1 ml. of a 2% aqueous solution of polyacrylamide having a molecular weight of 600,000. The precipitate formed in the mixture was allowed to stand for 48 hours at room temperature. After 12 hours, the precipitate had settled to the bottom of the glass vial and the supernatant liquid was clear after 48 hours. The material was filtered through a No. 5 Whatman filter paper. The filtrate was a clear amber liquid.

The sample of the same beer prior to the addition of the polyacrylamide, was filtered through a No. 5 Whatman filter paper and used as a control.

The two filtered beers were cooled for 20 minutes in a mixture of crushed ice and water. The untreated beer developed a definite haze on cooling, whereas the treated beer remained clear.

The light transmittancy was determined on the two samples using a Fisher Electrophotometer. The control beer (untreated) showed a light transmittancy of 78.7% whereas the treated beer showed a light transmittancy of 99%.

It is to be noted that the precipitation of natural tannin substances occurs by the addition of the polymer or copolymer of acrylamide in larger amounts up to 3½ times the quantity of the natural tannin substance present. Thus when an excess of either the polymer or copolymer of acrylamide is not objectionable in the residual liquid medium, amounts from 2½ to 3½ parts of the polymer or copolymer per part by weight of natural tannin substances can be added to such solutions or liquid mediums to effect complete precipitation of the natural tannin substances. Moreover, when it is necessary to reduce but not to eliminate the natural tannin substances from aqueous or other liquid media, the proportion of the natural tannin substances can be readily regulated by adding an amount of either the polymer or copolymer corresponding to the aforesaid proportion of 2–2½ times the weight of the natural tannin substance present.

If on the other hand clear solutions are desired, the polymeric or copolymeric acrylamide-natural tannin substance precipitated can be removed by filtration, centrifuging, decanting or with suitable filter media or clarifying aids such as silica, aluminum hydroxide gel, fuller's earth and the like. Generally however, filtering substances of this type are not required to cause the process of the present invention to operate in a satisfactory manner. In cases where the precipitate is not objectionable such as in rubber latex dispersions, the precipitate can be allowed to remain in the fluid mixture.

The temperatures employed in precipitating or coagulating the tannins and/or protein-tannin complexes should not exceed 30–35° C. In lieu of room temperatures and slightly above, temperatures as low as the freezing point of the liquid medium, so long as the liquid medium remains liquid, may be used. Although not critical the pH value of the liquid medium whether aqueous, alcohol or alcohol-water should not substantially exceed the limits of 5 to 7.

As observed from the foregoing discussion and from the illustrative working examples, it becomes clearly manifest that the concentration of any one of the polymers and copolymers described herein is not critical. Fairly concentrated solutions of the polymer or copolymer may be employed so long as their viscosity does not interfere with their handling. Relatively concentrated solutions are preferred in order to minimize dilution of the material containing the tannin, tannic acid or protein-tannin complex. Concentrations from 10 to 20% by weight of either the polymer or copolymer in the added solution are advantageous to attain the desirable features of the present invention.

I claim:

1. The process of precipitating substances selected from the group consisting of natural tannins and protein-tannin complexes from liquid mediums containing the same which comprises adding to said liquid medium, in a precipitating amount, a polyacrylamide having the following general formula:

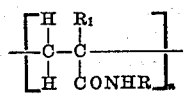

wherein R represents a member selected from the group consisting of hydrogen, methyl and ethyl groups, $R_1$ represents a member selected from the class consisting of hydrogen and methyl and $n$ represents the extent of polymerization indicative of a molecular weight ranging from 100,000 to 2,500,000.

2. Process for precipitation of natural tannin substances from an aqueous solution containing the same which comprises adding to said solution, in a precipitating amount, a polyacrylamide having the following general formula:

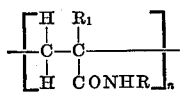

wherein R represents a member selected from the group consisting of hydrogen, methyl and ethyl groups, $R_1$ represents a member selected from the class consisting of hydrogen and methyl and $n$ represents the extent of polymerization indicative of a molecular weight ranging from 100,000 to 2,500,000.

3. The process according to claim 1 wherein the polyacrylamide is polyethylacrylamide having a molecular weight of 100,000 to 2,500,000.

4. The process according to claim 1 wherein the polyacrylamide is polymethylacrylamide having a molecular weight of 100,000 to 2,500,000.

5. The process according to claim 1 wherein the polyacrylamide is poly-N-methylacrylamide having a molecular weight of 100,000 to 2,500,000.

6. The process according to claim 1 wherein the polyacrylamide is poly-N-ethylacrylamide having a molecular weight of 100,000 to 2,500,000.

References Cited in the file of this patent

UNITED STATES PATENTS

| | | |
|---|---|---|
| 2,522,668 | Dudley | Sept. 19, 1950 |
| 2,688,550 | McFarlane | Sept. 7, 1954 |
| 2,811,448 | Witwer et al. | Oct. 29, 1957 |